United States Patent [19]
Davis et al.

[11] Patent Number: 6,085,806
[45] Date of Patent: Jul. 11, 2000

[54] ENVIRONMENTALLY SAFE KIT FOR CHANGING MOTOR OIL

[76] Inventors: Chester Ray Davis; Joann Davis, both of 11639 Long Play, Houston, Tex. 77044

[21] Appl. No.: 09/228,514

[22] Filed: Jan. 11, 1999

Related U.S. Application Data

[60] Provisional application No. 60/094,330, Sep. 28, 1998.

[51] Int. Cl.[7] .................................................. B65B 1/04
[52] U.S. Cl. ............................... 141/98; 141/86; 141/87; 141/237; 141/331; 141/340; 141/363; 141/364; 184/106
[58] Field of Search ................................. 141/86–88, 98, 141/234, 237, 242, 244, 246, 331, 340, 363, 364, 383, 384; 184/106

[56] References Cited

U.S. PATENT DOCUMENTS 4,880,156  11/1989  Wallet ..................................... 232/43.1
4,930,602   6/1990  Gust ........................................ 184/106

*Primary Examiner*—Steven O. Douglas
*Assistant Examiner*—Timothy L. Maust
*Attorney, Agent, or Firm*—Marvin J. Marnock

[57] ABSTRACT

An oil drain kit for collecting used motor oil comprising an oil drain collection pan, having a bottom wall raised at the center and sloping to its marginal extremity where it is joined with a side wall having a radial flange at the top of the wall and which extends circumferentially thereabout with a downwardly extending edge portion. The bottom wall is provided at its extremity adjacent its junction with the side wall with at least three discharge openings, each with a funnel spout extending downwardly therefrom. The spouts are adapted to receive the necks of empty oil containers which connect therewith and serve as supporting legs for the drain collection pan. A tray receives the containers when placed therein and facilitates sliding the kit under the oil drain plug of a motor to collect used oil draining therefrom and for removing it when draining is completed. The tray when inverted also serves as a cover for the kit, which may include empty or full oil containers in its drain pan for storage purposes or for marketing. Projections on the inner face of the tray side wall are adapted to latchingly engage the edge of the drain pan flange when the tray cover is slipped thereover. A circular bead on the bottom of the tray becomes located at the top of the kit when the tray is used as a cover and allows stacking of kits and prevents an upper kit from sliding off the lower kit on which it rests.

10 Claims, 3 Drawing Sheets

ENVIRONMENTALLY SAFE KIT FOR CHANGING MOTOR OIL

This application claims benefit of Provisional application Ser. No. 60/094,330 filed Jul. 28, 1998.

BACKGROUND OF THE INVENTION

Several attempts have been made to develop an oil change kit to be used to change the motor oil in a motor vehicle. One oil change kit described in U.S. Pat. No. 4,524,866 by Paul Pollocco issued Jun. 25, 1985 has an oil catch pan that rests on a jug. This particular kit is "designed to be effectively opened, e.g. by pulling a conveniently located tab or by interact.-on with a piercing structure which is fitted between the pan and the jug." Another example is desclosed in U.S. Pat. No. 4,930,602 by Kenneth Gust issued Jun. 5, 1990. This particular kit "employs one gallon milk or water jugs or bottles to receive the drained oil for collection and subsequent disposition." The two patents described previously and other patents of oil drain pans do not a safe and practical way of catching and insuring the used oil is sealed until properly disposed of. Their number of more or less complicated features fail to solve the problem in an efficient and economical way. After researching and reviewing the different kits of the prior art that have been patented we have developed an improved kit that is practical and will be used to recycle oil and the plastic containers it comes in.

SUMMARY OF THE INVENTION

The objective of this invention is to provide an improved oil drain kit. We not only want to improve this kit but make it more convenient and environmentally safe for the disposal of used motor oil.

The need to recycle all used oil is necessary to preserve our oil reserves and help our environment. Other methods that allow used oil to be wasted by dumping is polluting our environment and more specifically polluting our drinking water. This new an improved oil drain kit will promote recycling. Most importantly this oil drain kit uses the original standard one quart containers that the oil is sold in. Not only are we going to recycle the oil but also recycle the containers.

There are several different aspects that make this product unique. For example, some drain pans in the past were made of metal that would allow them to get bent or rust. This oil drain kit is made of high density polyethylene that is very durable and long lasting. Secondly, once the oil is drained from the vehicle the containers can be properly sealed, stored, and placed back in the box they came in. Another great aspect of this product is that it can be stacked on one another when being marketed. Also new quarts of oil can be marketed stored in the drain pan. After the first oil change is completed the empty containers can be stored inside the drain pan for the next oil change. Finally, not only do we want to make a great product for the consumer we also want to make it affordable and easy to assemble and use.

DETAILED DESCRIPTION OF DRAWINGS

Figure 1:
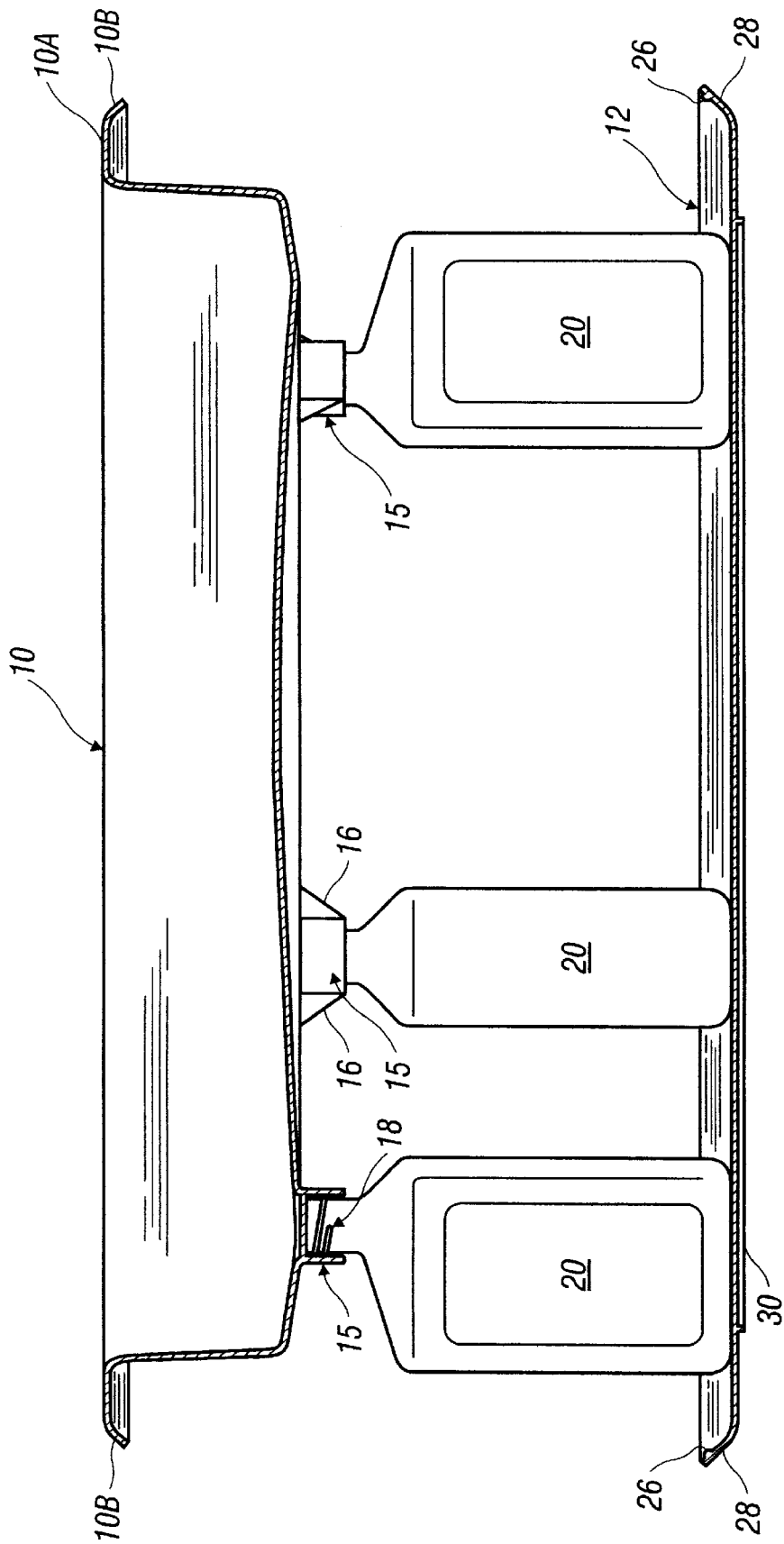
FIG. 1 is a side view of the round oil drain pan components of the invention with containers attached to the bottom thereof.

FIG. 1 shows a side view in section of the round oil drain pan 10 and tray 12 of the invention with empty oil containers 20 attached to the pan. The pan 10 is shallow as it only catches the used oil drained from the crank case and oil filter and does not hold the oil. Also, minimum height is important when placing the unit under the vehicle. FIG. 1 shows a radial flange 10A having a turned down portion 10B which provides the outer edge of the top of the pan. This provides a place to grip the pan when carrying to and from the vehicle. FIG. 1 shows the containers 20 attached to the pan 10. They are screwed into threaded connections provided by downwardly extending funnel spouts 15 located around the outer extremity of the bottom wall 11. FIG. 1 shows the center of the pan raised slightly and sloping to the outer edge so as to cause the oil to flow into the containers. FIG. 1 shows discharge openings provided by the internally threaded funnel spouts 15 which provide for threaded connections where the containers are attached. The spouts 15 are formed integral with the pan from the same polyethylene material. The connection spouts 15 are provided with the same threads as are provided on standard one quart oil containers. The walls of the connecting spout are of sufficient thickness to provide a stable long lasting connection with the container 20 to which it is connected. FIG. 1 shows the braces 16 provided in diametrically opposed relationship on each side of the connections 15 and formed with the same plastic polyethylene to give more stability. FIG. 1 also shows a tray 12 made of the same material as the pan 10 and which is used to place under the containers and drain pan when attached thereto and to slide the kit under the drain plug of a motor in position to receive oil drained therefrom and then out from under the vehicle when the oil has been drained from the crank case. The tray with an upturned circumferential edge portion 28 also catches any oil spilled when disconnecting the containers.

The tray 12 is also designed to become a cover or lid and snap on to the top of the drain pan 10 after the oil change has been completed. FIG. 1 shows the small bumps 26 provided on the inward facing side of the tray edge portion 28 as a means to fasten the tray on top of the oil drain pan when it is desired to stow the kit and stack it on top of another. Due to the flexibility of the plastic, the edge portion 28 of the tray when the tray is turned over, can be easily forced over the turned down portion 10 of the drain pan flange 10A so that the bumps 26 lodge beneath the edge of the pan flange 10A and thereby secure the tray as a releasable cover for the drain pan.

Figure 3:
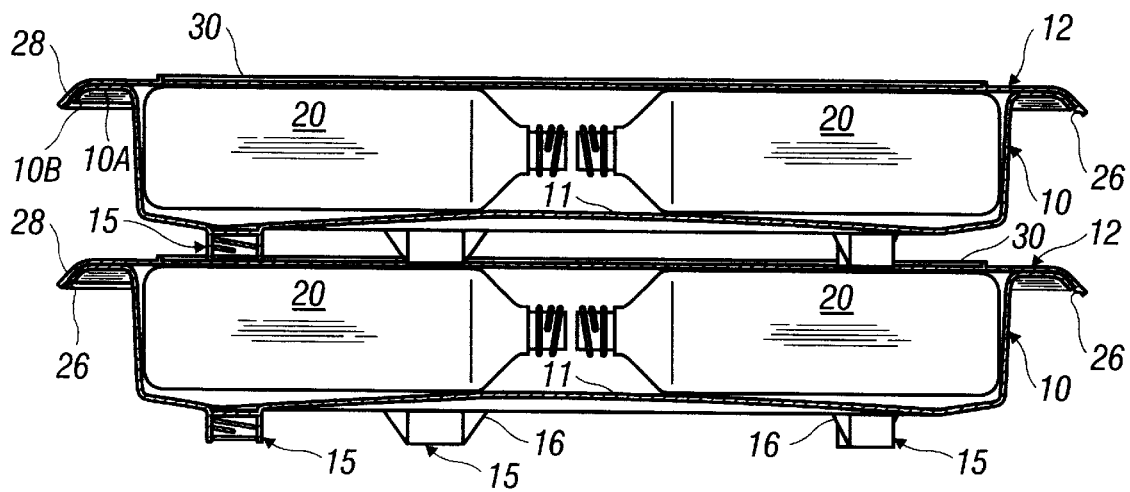
FIG. 3 is a side view in section showing units of the invention being stacked one atop the other with oil containers stored in the drain pan.

FIG. 1 also shows a small bead 30 of plastic that forms a circle 31 near the outer edge of the underside of the tray which becomes the top of the kit when the tray is turned upside down as shown in FIG. 3. When the units are stacked on one another, the bottom of the upper unit is placed inside the bead circle on top of the kit on which it is placed. This eliminates the top unit from sliding off the unit it is resting upon.

Figure 2:
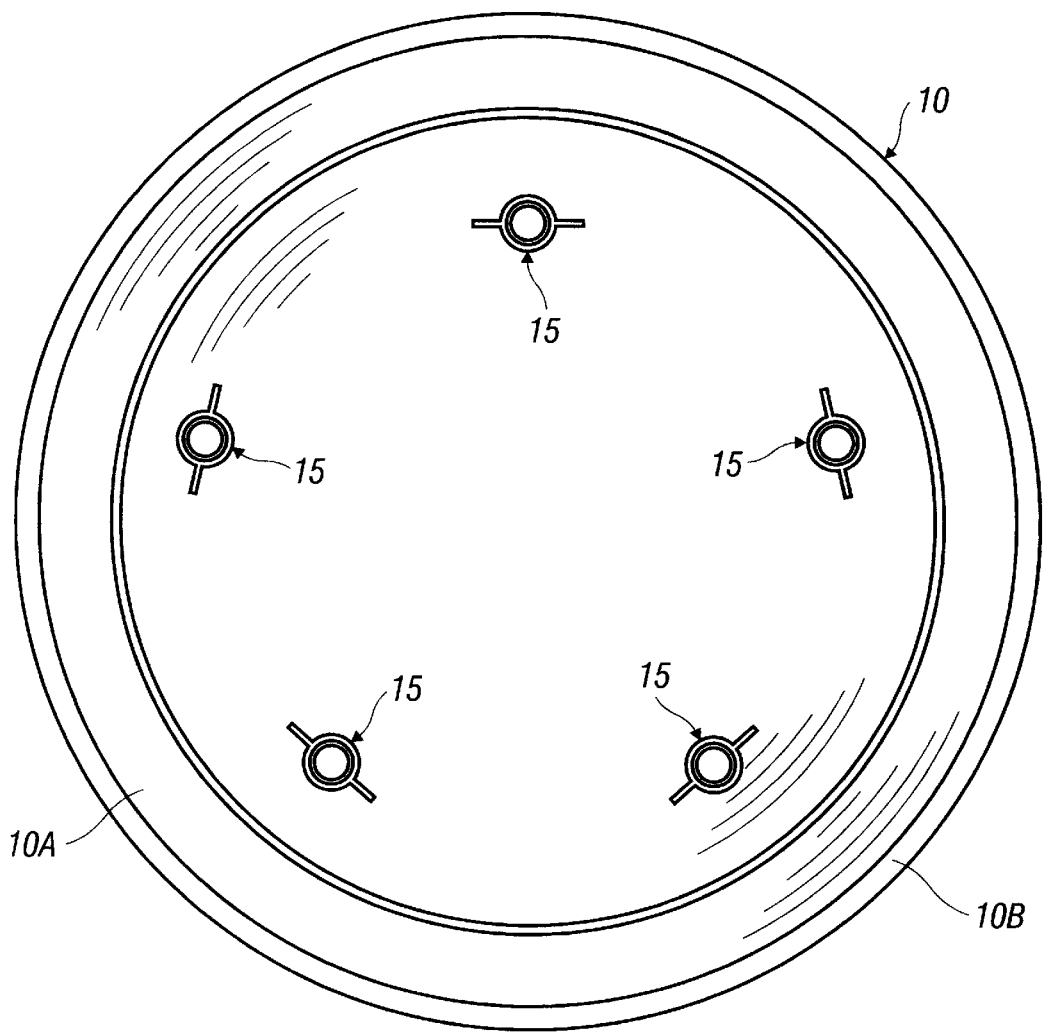
FIG. 2 is the bottom view of the oil drain pan showing where the containers are attached.

FIG. 2 shows a bottom view of the oil drain collection pan and the openings where the containers are screwed into the threads of the spouts 15, FIG. 2 also shows the braces 16 on each side of the connections.

FIG. 3 shows how the kit units can be stacked when being marketed with the containers being stored inside the units.

Full containers of new oil can also be stored inside the oil drain pan for marketing purposes.

Figure 4:
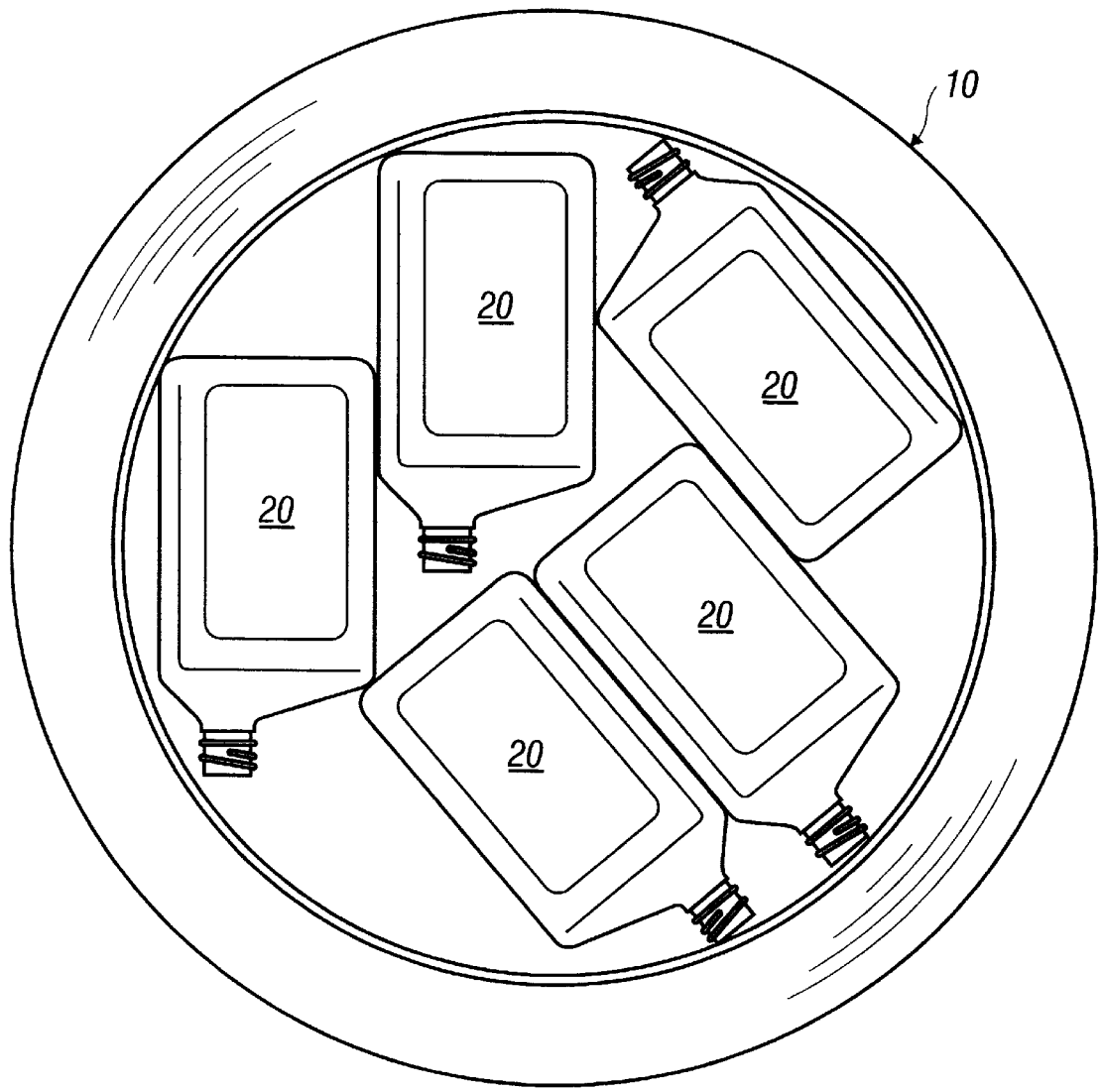
FIG. 4 is a top perspective view of the drain pan of the invention showing another arrangement of containers inside the oil drain pan.

FIG. 4 shows the containers being stored inside the oil drain pan ready for the next oil change.

It is to be Understood that the foregoing description of a preferred embodiment of the invention has been presented for purposes of illustration and explanation and is not intended to limit the invention to the precise form disclosed. For example, the container need not necessarily be the conventional quart size bottles in which engine oil is typically sold although they should be of a size which permits the kit to be placed under the automobile directly beneath the crankcase drain plug. Also, materials other then polyethylene might be used for the kit components so long as they provide suitable durability and flexibility to permit latching the tray to the drain collection pan when the kit is prepared for stacking.

Accordingly, it is to be appreciated that changes may be made in the precise structure of the kit and the materials of which the kit components are made without departing from the spirit of the invention.

What is claimed is:

1. An oil drain kit for collecting and disposing used motor oil, said kit comprising:
    an oil collection pan having a bottom wall raised at its center and sloping to its marginal extremity where it is joined with a side wall having a radial flange extending thereabout with a downwardly extending flange edge portion, said bottom wall being provided with at least three discharge openings in substantially horizontal co-planar spaced relationship and adjacent to its junction with said side wall;
    a funnel spout provided at each said opening and extending downwardly therefrom, each said spout having means for receiving the threaded ends of an empty oil container in substantially sealing connection therewith, said empty oil containers serving as supporting legs for supporting the oil collection pan in stable relation when connected thereto; and
    a tray having, a bottom wall and a side wall extending thereabout and adapted to receive said containers when placed therein with the oil collection pan attached, said tray having at least a pair of projections in the inner surface of the tray side wall which projections serve to detachingly engage the edge of the downwardly extending flange portion of the oil collection pan when said tray is turned over and placed atop the collection pan as a cover therefor whereby said kit may be stored with said containers placed inside the collection pan.

2. An oil drain kit as shown in claim 1, wherein said oil collection pan and said tray are made of plastic.

3. An oil drain kit as set forth in claim 1 wherein said tray is further provided with a circular bead on its bottom surface which when the tray is turned upside down and fastened atop the oil collection pan, a plurality of said oil drain kits may be stacked one atop the other and said circular bead tends to prevent an upper kit from sliding off the lower kit on which it is stacked.

4. An oil drain kit as set forth in claim 1 wherein said tray is of circular configuration and said collection pan is provided with a bottom wall which is upwardly convex in configuration.

5. An oil drain kit as set forth in claim 1 wherein said circular bead is concentric with said tray and if of a diameter sufficient to receive within its border all of the downwardly extending spouts of the collection pan of another kit when stacked thereon.

6. An oil drain kit for collecting and disposing used motor oil, said kit comprising:
    an oil collection pan having a bottom wall raised at its center and sloping to its marginal extremity where it is joined with a side wall having a radial flange extending thereabout circumferentially with a downwardly extending flange edge portion, said bottom wall being provided with at least three discharge openings in substantially horizontal co-planar spaced relationship and adjacent to its junction with said side wall;
    a funnel spout provided at each said opening and extending downwardly therefrom, each said spout being internally threaded and adapted to receive the threaded end of an empty oil container in sealing connection therewith, said empty oil containers serving as supporting legs for supporting the oil collection pan in stable relation when connected thereto;
    a tray having a bottom wall and a side wall integrally joined with said tray bottom wall and extending thereabout whereby said tray serves to receive said containers when placed therein with the oil collection pan attached, said tray having at least a pair of projecting bumps on the inner surface of the tray side wall, which projecting bumps serve to latchingly engage the edge of the downwardly extending flange portion of the oil collection pan when said tray is turned over and placed atop the collection pan as a cover therefor whereby said kit may be stored with said containers placed inside the collection pan.

7. An oil drain kit as set forth in claim 6 wherein said tray is further provided with a circular bead on its bottom surface which when the tray is turned upside down and fastened atop the oil collection pan, a plurality of said oil drain kits may be stacked one atop the other and said circular bead tends to prevent an upper kit from sliding off the lower kit on which it is stacked.

8. An oil drain kit as set forth in claim 6 wherein said kit is made of plastic.

9. An oil drain lot as set forth in claim 6 wherein said kit is made of polyethylene.

10. An oil drain kit as set forth in claim 6 wherein said oil collection pan and tray are of circular configuration.

* * * * *